United States Patent [19]
Blackwell et al.

[11] Patent Number: 5,979,185
[45] Date of Patent: Nov. 9, 1999

[54] METHOD AND APPARATUS FOR FORMING SILICA BY COMBUSTION OF LIQUID REACTANTS USING A HEATER

[75] Inventors: Jeffery L. Blackwell, Corning; Xiaodong Fu; Daniel W. Hawtof, both of Painted Post, all of N.Y.; Danny L. Henderson, Monroe, N.C.

[73] Assignee: Corning Incorporated, Corning, N.Y.

[21] Appl. No.: 09/089,869

[22] Filed: Jun. 3, 1998

Related U.S. Application Data

[60] Provisional application No. 60/052,711, Jul. 16, 1997.

[51] Int. Cl.$^6$ .................................................. C03B 20/00
[52] U.S. Cl. .................................. 65/17.4; 65/414; 65/421
[58] Field of Search .................... 65/17.2, 17.4, 65/414, 421

[56] References Cited

U.S. PATENT DOCUMENTS

| | | | |
|---|---|---|---|
| 2,188,121 | 1/1940 | Smith | 47/78.1 |
| 2,239,551 | 4/1941 | Dalton et al. | 49/79 |
| 2,269,059 | 1/1942 | McLachlan | 23/140 |
| 2,272,342 | 2/1942 | Hyde | 49/78.1 |
| 2,326,059 | 8/1943 | Nordberg | 106/52 |
| 3,117,838 | 1/1964 | Sterling et al. | 23/182 |
| 3,416,890 | 12/1968 | Best et al. | 23/182 |
| 3,486,913 | 12/1969 | Zirngibl et al. | 106/288 |
| 3,489,579 | 1/1970 | Steverding | 106/52 |
| 3,666,414 | 5/1972 | Bayer | 106/52 |
| 3,698,936 | 10/1972 | Moltzan | 117/105.2 |
| 3,883,336 | 5/1975 | Randall | 65/18 |
| 4,165,223 | 5/1979 | Powers | 65/2 |
| 4,242,487 | 12/1980 | Yajima et al. | 528/25 |
| 4,414,164 | 11/1983 | Roba et al. | 264/1.2 |
| 4,436,765 | 3/1984 | Feng et al. | 427/74 |
| 4,491,604 | 1/1985 | Lesk et al. | 427/8 |
| 4,501,602 | 2/1985 | Miller et al. | 65/18.2 |
| 4,529,427 | 7/1985 | French | 65/3.12 |
| 4,810,673 | 3/1989 | Freeman | 437/239 |
| 5,043,002 | 8/1991 | Dobbins et al. | 65/3.12 |
| 5,108,665 | 4/1992 | Crooker et al. | 264/6 |

(List continued on next page.)

FOREIGN PATENT DOCUMENTS

| | | |
|---|---|---|
| 0026625 B1 | 9/1980 | European Pat. Off. . |
| 0463783 A1 | 6/1991 | European Pat. Off. . |
| 0709487 A1 | 10/1995 | European Pat. Off. . |
| 55-23067 | 2/1980 | Japan . |
| 56-14438 | of 1981 | Japan . |
| 58-213639 | 12/1983 | Japan . |
| 60-108338 | of 1985 | Japan . |
| 60-90838 | 5/1985 | Japan . |
| 1-138145 | 5/1989 | Japan . |

OTHER PUBLICATIONS

"Atomization and Sprays", Arthur H. Lefebvre, Purdue University, 1989, Hemisphere Publishing Co., Table of Contents, p. ix–25, 105–153 (preface, Chapters 1 & 4) no month available.

(List continued on next page.)

*Primary Examiner*—Stanley S. Silverman
*Assistant Examiner*—Sean Vincent
*Attorney, Agent, or Firm*—Scott S. Servilla; Robert L. Carlson

[57] ABSTRACT

The present invention is directed to a method for making silica glass and silica glass preforms. A liquid, preferably halide-free, silicon-containing compound capable of being converted by thermal oxidative decomposition to $SiO_2$ is provided and introduced directly into the flame of a combustion burner, which converts the compound to silica, thereby forming finely divided amorphous soot. The soot is vaporized proximate the site where the liquid is converted into silica glass by atomizing the liquid, preferably with a stream of atomizing gas. A heater proximate the burner face and around the burner flame increases soot capture rate and allows for a reduction of the velocity of the atomizing gas. The amorphous soot is deposited on a receptor surface where, either substantially simultaneously with or subsequently to its deposition, the soot is consolidated into a body of fused silica glass.

22 Claims, 4 Drawing Sheets

U.S. PATENT DOCUMENTS

| | | |
|---|---|---|
| 5,110,335 | 5/1992 | Miller et al. .............................. 65/3.12 |
| 5,152,819 | 10/1992 | Blackwell et al. ....................... 65/3.12 |
| 5,170,727 | 12/1992 | Nielsen .................................... 110/346 |
| 5,268,337 | 12/1993 | Katz et al. ................................ 501/94 |
| 5,297,738 | 3/1994 | Lehr et al. ............................... 239/708 |
| 5,458,681 | 10/1995 | Hawegawa et al. .................... 106/490 |
| 5,622,750 | 4/1997 | Kilian et al. ......................... 427/163.2 |
| 5,703,191 | 12/1997 | Henderson et al. ...................... 528/31 |

OTHER PUBLICATIONS

"Liquid Atomization", L. Bayvel, Z. Orzechowski, 1993, Taylor & Frances Publishing, Table of Contents, p. vii–36, 159–236, 457–462 (preface, Chapters 1 & 4, subject index) no month available.

Vol. 4 No. 50 (C–7) [532] Japanese Patent Abstracts p. 135 (7), Feb. 19, 1980.

METHOD AND APPARATUS FOR FORMING SILICA BY COMBUSTION OF LIQUID REACTANTS USING A HEATER

This application claims benefit of Provisional application No. 60/052,711, filed Jul. 16, 1997.

FIELD OF THE INVENTION

The present invention relates to the formation of silica and silica preforms and, more particularly, to a method and apparatus for forming silica and silica preforms from liquid silicon- containing compounds.

BACKGROUND OF THE INVENTION

Silicon, germanium, zirconium, and titanium metal halides are often used as vaporous reactants in forming metal oxide glasses. For example, hydrolysis of $SiCl_4$ has been the industry preference for producing high purity silica over the years. The oxidation of $SiCl_4$, through pyrolysis and hydrolysis, however, has the disadvantage of producing chlorine or a very strong acid by-product, hydrochloric acid (HCl). Hydrochloric acid is detrimental not only to many deposition substrates and to reaction equipment but also is harmful to the environment. Emission abatement systems have proven to be very expensive due to loss and maintenance of equipment caused by the corrosiveness of HCl.

As an alternative, high purity quartz or silica has also been produced by thermal decomposition and oxidation of silanes. However, this requires taking safety measures in handling because of the violent reaction that results from the introduction of air into a closed container of silanes. Silanes react with carbon dioxide, nitrous oxide, oxygen, or water to produce high purity materials that are potentially useful in producing, among other things, semiconductor devices. However, silanes have proven to be much too expensive and reactive to be considered for commercial use except possibly for small scale applications requiring extremely high purity.

U.S. Pat. No. 5,043,002 to Dobbins et. al, which is relied upon and incorporated by reference, proposed alternative silica precursor materials. This patent disclosed bubbling a carrier gas through a silicon-containing reactant compound, preferably a halide-free compound such as polymethylsiloxanes, in particular, polymethylcyclosiloxanes such as hexamethylcyclotrisiloxane, octamethylcyclotetrasiloxane ("OMCTS"), and decamethylcyclopentasiloxane. A mixture of the reactant compound vapor and nitrogen is transported to the burner at the reaction site, where the reactant is combined with a gaseous fuel/oxygen mixture and combusted. U.S. Pat. No. 5,152,819 to Blackwell et al., the disclosure of which is relied upon and incorporated by reference, describes additional halide-free silicon compounds, in particular, organosilicon-nitrogen compounds having a basic Si-N-Si structure, siloxasilazones having a basic Si-N-Si-O-Si structure, and mixtures thereof, which may be used to produce high purity silica glass without the concomitant generation of corrosive, polluting by-products.

Although use of halide-free silicon compounds as feedstocks for silica glass production avoids the formation of HCl, some problems remain, particularly when the glass is intended for the formation of high purity bulk fused silica and high quality optical products such as optical waveguides. For example, as disclosed in copending U.S. patent application No. 08/574,961 entitled "Method for Purifying Polyalkylsiloxanes and the Resulting Products," which is relied upon and incorporated by reference, the presence of high boiling point impurities in, for example, a polyalkylsiloxane feedstock, can result in the formation of gel deposits in the vaporization and delivery systems carrying the vaporous reactants to the burner or within the burner itself. Such polymerizing and gelling of the siloxane feedstock inhibits the controllability and consistency of the silica manufacturing process. This problem is more prevalent when an oxidizing carrier gas such as oxygen is included in the reactant vapor stream, because oxidizers appear to catalyze polymerization of the siloxane feedstock. Such polymerizing and gelling reduces the deposition laydown rate of the bulk silica soot or soot preform that may be subsequently consolidated to a blank from which an optical waveguide is fabricated.

An additional problem encountered when silica soot or silica preforms are formed using siloxane feedstocks is that particulates of the high molecular weight, high boiling impurities may be deposited in the bulk silica soot or on the optical waveguide fiber blank, resulting in "defect" or "clustered defect." Defects or clustered defects are imperfections that adversely affect the optical and structural quality of the optical waveguides formed using the silica soot.

In copending application Ser. No. 08/767,653, the content of which is relied upon and incorporated by reference, it is disclosed that the clustered defects could be reduced by delivering a liquid siloxane feedstock to a conversion site, atomizing the feedstock at the conversion site, and converting the atomized feedstock at the conversion site into silica. One way to atomize the feedstock at the conversion site involves pneumatically or "airblast" atomizing the liquid siloxane feedstock by delivering the liquid feedstock to the conversion site with an inert gas.

Although atomizing the liquid siloxane feedstock proximate the conversion site reduces clustered defects, such a liquid delivery system presents several further challenges. For example, increasing the atomizing gas velocity desirably produces smaller liquid droplets, which are more readily vaporized and burned in the burner flame. Smaller droplets are desirable because larger droplets cause wart-like defects ("warts") on the surface of the soot blank. In addition, smaller droplets can be more easily focused with the surrounding gases to produce a more focused deposition stream. On the other hand, increasing atomizing gas velocity adds turbulence to the burner flame, which reduces the soot capture rate and is one cause of a physical soot defect known as "lizard skin." Lizard skin is a term for a rough soot blank surface.

Accordingly, it would be desirable to provide a method in which a liquid delivery system could produce a focused deposition stream containing small droplets without a high gas velocity, and in which there is low burner flame turbulence.

SUMMARY OF THE INVENTION

Accordingly, the present invention generally provides a method and apparatus for manufacturing silica and silica blanks or preforms in which a system delivers a liquid feedstock precursor to a conversion site, typically a burner flame, in which the liquid feedstock is converted to silica particles. Applicants have now discovered that utilizing a heater proximate the conversion site provides for the combustion of larger liquid droplets, thus reducing the need for high gas velocity to more fully vaporize the liquid droplets, and thus having low burner flame turbulence. Additional features and advantages of the invention will be set forth in the description which follows, and in part will be apparent from the description, as well as the appended drawings.

To achieve these and other advantages, the invention includes a method of and an apparatus for manufacturing silica, which involves delivering a liquid feedstock, preferably siloxane, in liquid form to a conversion site. The feedstock is atomized proximate the conversion site and converted to silica in a combustion burner. Advantageously, the invention includes a heater proximate the atomized feedstock. The heater may comprise an enclosure such as refractory brick or another heat retaining material around the conversion site to retain the heat of the combustion burner. The heater may comprise a ring type heater around the conversion site with an additional heat source, such as an electric resistance heating element.

The invention further comprises an apparatus for forming silica from liquid, preferably halide-free, silicon-containing reactants that comprises a tank containing a liquid feedstock and a liquid feedstock delivery conduit having first and second terminal ends. The apparatus also comprises a combustion burner which, in operation, generates a conversion site flame and a liquid feedstock injector proximate the second terminal end of the liquid feedstock delivery conduit for supplying a liquid silicon-containing compound to the flame.

Advantageously, a heater is located proximate the conversion site, which enables the apparatus to produce a more focused soot stream having more finely divided soot particles than without a heater. The heater may be comprised of an enclosure around the conversion site to retain the heat of the combustion burner, such as refractory brick or other heat retaining material, or the heater may be an auxiliary heater, such as a ceramic ring heater. The combustion burner flame converts the compound by thermal oxidative decomposition to a finely divided amorphous soot and a receptor surface positioned with respect to said combustion burner to permit deposition of the soot on the receptor surface.

Applicants have discovered that providing a heater proximate the conversion site improves the yield and quality of the silica produced by reducing the aforementioned lizard skin defect on the surface of soot preforms. The heater enables the combustion of larger liquid droplets. Thus, when a pneumatic atomizer is utilized to atomize the feedstock, the heater significantly reduces the gas flow required to atomize the feedstock.

It is to be understood that both the foregoing general description and the following detailed description are exemplary and explanatory and are intended to provide further explanation of the invention as claimed.

The accompanying drawings are included to provide a further understanding of the invention illustrate several embodiments of the invention, and together with the description, serve to explain the principles of the invention. Wherever possible, the same reference characters will be used throughout the drawings to denote similar elements.

DETAILED DESCRIPTION OF THE INVENTION

Figure 1:
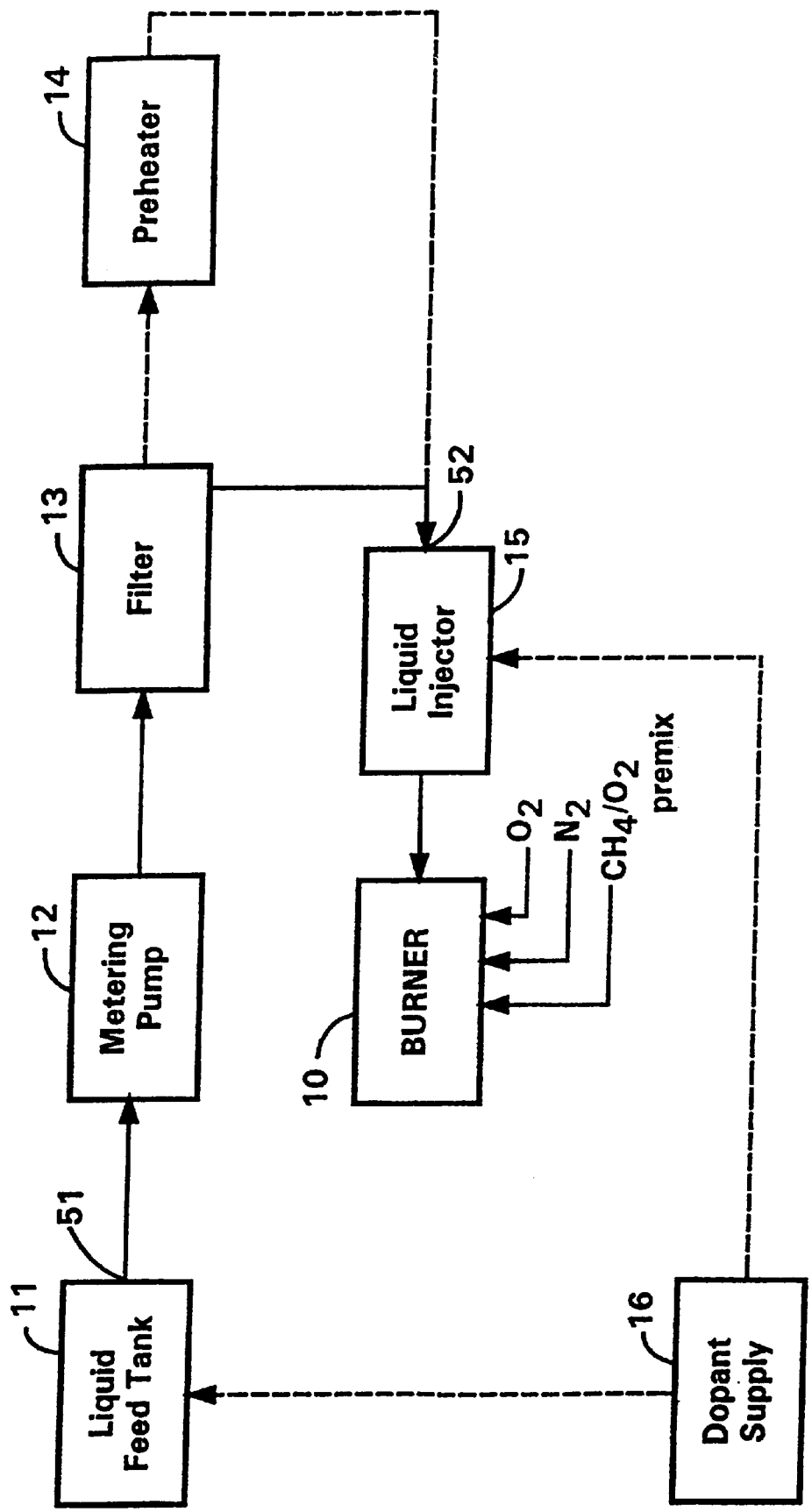
FIG. 1 is a block diagram of a reactant delivery system used in accordance with the present invention.

Reference will now be made in detail to the present preferred embodiments of the invention which are illustrated in the accompanying drawings. In accordance with the invention, the present invention for a silica manufacturing apparatus, FIG. 1 schematically depicts a system for delivering liquid siloxane feedstock and, optionally, dopant-providing compounds to a conversion site where the liquid siloxane feedstock is converted into silica. The conversion from liquid feedstock to silica occurs preferably in an area proximate a burner 10, which is preferably a combustion burner.

A liquid siloxane feedstock such as a polymethylcyclosiloxane is stored in feedstock tank 11. Feedstock tank 11 is connected to liquid feedstock injector 15 at the reactant introduction site via a liquid feedstock transporting conduit system that can, if desired, include metering pump 12, optional filter 13, and preheater 14. Said liquid feedstock transporting conduit has a first terminal end 17 connected to the liquid feedstock tank 11, and a second terminal end 18 proximate the liquid feedstock injector 15. The siloxane feedstock liquid from tank 11 is transferred through the liquid feedstock transporting conduit by pump 12 through filter 13 to optional preheater 14. The liquid delivered through filter 13 is under sufficient pressure to substantially prevent and inhibit its volatilization in preheater 14, which is optionally employed to warm the liquid reactant prior to its introduction into burner 10 and avoids the high temperatures of a vaporizer which normally promote gel formation. The burner preferably is conventionally provided with inner shield gas, outer shield gas, and a mixture of methane and oxygen for the flame, as described, for example, in U.S. Pat. No. 4,165,223 to D. R. Powers, which is hereby relied upon and incorporated by reference.

The liquid reactant is conveyed from optional filter 13 or optional preheater 14 through second terminal end 18 to liquid injector 15, which delivers the liquid to burner 10. Injector 15 comprises a device for delivering the liquid reactant, either as a liquid stream or as atomized liquid particles, directly into the flame of burner 10. We generally refer in the discussion to the reactant as being in "liquid" form. What we mean by that expression is that the reactant is in a substantially liquid state. Some small portion of the reactant may be in vapor form, particularly where preheater 14 is employed, or where a nitrogen blanket over the liquid is employed. A small portion of the reactant can be in vapor form as delivered to the combustion site without adversely affecting the operation of the invention.

Liquid injector 15 can comprise, for example, a syringe provided with a fine needle, by which a liquid stream can be injected at high velocity into the burner flame. Although a syringe can be used on a small scale, commercial operations will require a reasonable large scale equivalent, e.g., an atomizer.

Several types of atomizing means capable of forming very small particles of liquid are known in the atomization art as disclosed in *Atomization and Sprays,* by Arthur H. Lefebure, Hemisphere Publishing Co., 1989, which is incorporated herein by reference. Atomizers can be operated by various energy sources such as liquid, gas, mechanical, electrical and vibrational, and may be categorized as, for example, jet, swirl, jet-swirl, pneumatic, rotary, acoustic, ultrasonic, and electrostatic. Preferably, a jet atomizer is used; even more preferably, the jet atomizer is a swirl-jet atomizer, which swirls the liquid and then, as atomizers generally do, squirts the liquid at high velocity out of a small orifice. Various types of atomizers are discussed in *Liquid Atomization,* by L. Bayvel and Z. Orzechowski, Taylor & Francis, (1993), which is hereby incorporated by reference.

Another preferred type is a pneumatic atomizer operated by inert gas, oxygen gas, a mixture of oxygen and an inert gas, air, or combustible gas pressure. By inert gas, we mean a gaseous element such as nitrogen, argon, or helium, which is nonreactive under ordinary conditions. By combustible gas, we mean a gas that is typically used in the combustion of silica precursors, such as methane, or a mixture of methane and oxygen. In particularly preferred embodiments, the atomizer can be incorporated into the structure of the combustion burner.

The atomized particles of the siloxane reactant compound are combusted in a burner fueled by a combustible gas, preferably, a combination of methane and oxygen. The atomized reactant particles can be conveyed from the atomizer to the burner flame by a carrier gas such as an inert gas, oxygen, a mixture of an inert gas and oxygen, or a combustible gas.

Figure 2:
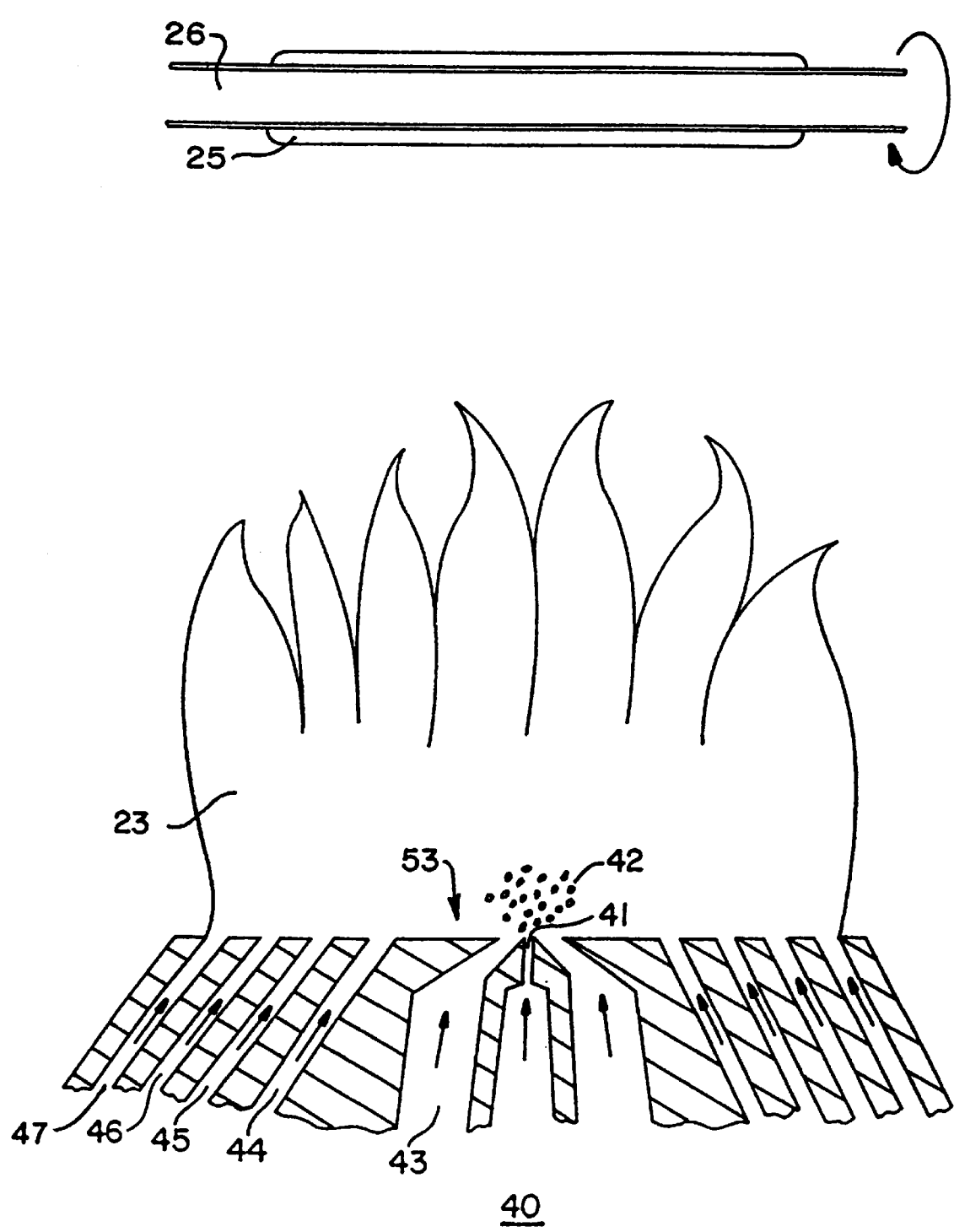
FIG. 2 is a schematic representation of a cross-sectional view of a burner structure having an atomizer incorporated therein that would be used with a heater in accordance with the present invention.

FIG. 2 is a cross-sectional view of an embodiment of the burner and atomizer apparatus used with the present invention. Here, burner 40 incorporates within its structure atomizer 41, which injects very finely atomized liquid reactant particles 42 into flame 23. Amorphous soot 25 produced by combustion of the liquid reactant may be collected on rotatable mandrel 26 to form a soot blank or preform which may be used to fabricate an optical waveguide. In an alternative embodiment, silica soot may be collected for subsequent consolidation, or the silica soot may be collected in a collection chamber in which the soot is immediately consolidated into its desired shape (not shown).

As shown in FIG. 2, burner 40 comprises a series of concentric channels surrounding atomizer 41. Liquid siloxane is delivered through atomizer 41. A stream of an inert gas such as nitrogen gas, a mixture of oxygen gas and nitrogen gas, or oxygen gas alone delivered through channel 43 atomizes the liquid feedstock by the kinetic energy of the flowing gas to create liquid projections 42 which are converted into soot reactant particles in burner flame 23. The area proximate to the burner face 53 and flame 23 thus acts as a conversion site for converting liquid projections 42 into soot reactant particles. Oxygen gas may be delivered to flame 23 through channels 45 and 46. An inert gas, such as nitrogen, argon or helium is delivered through channel 44 to inhibit reaction of the liquid feedstock and soot build-up on burner face 53. Applicants have found that when oxygen or a mixture of oxygen and inert gas is used as the atomizing gas, better results are obtained by delivering an inert gas through channel 44. A premix of oxygen and a fuel such as methane is conducted to the flame through outermost channel 47. In embodiments in which the silica soot blank is used to form optical waveguide fibers, a burner fitted with an atomizing injector, such as the embodiment depicted in FIG. 2, produces a wide soot stream, which achieves improved concentricity of core and cladding regions of the subsequently formed optical waveguide fiber.

A preferred atomizer unit 40 of the invention as shown in FIG. 2 comprises a pneumatic atomizer. With such a pneumatic atomizer, the liquid siloxane feedstock is atomized by the kinetic energy of a flowing gas stream through the channel 43. High velocity gas is utilized in atomizing the feedstock. This produces atomized liquid projections 42 with a gas velocity in the range of 0.5 to 50.0 m/sec. An inert gas, such as nitrogen or argon gas, oxygen gas, a combustible gas, or a mixture of oxygen and an inert gas may be used as the atomizing gas.

With the use of the pneumatic atomizer in the invention, the high velocity blast gas is deployed in an effective manner to achieve a beneficial level of atomization of the siloxane proximate the burner face and in the flame. In practicing the invention, even though it is preferred to have atomizer unit 40 as an integral part of the burner unit, it is possible to use a pneumatic atomizer which is spatially separated from the burner, as with atomizers shown in FIGS. 2 and 3 of copending application Ser. No. 08/767,653.

Figure 3:
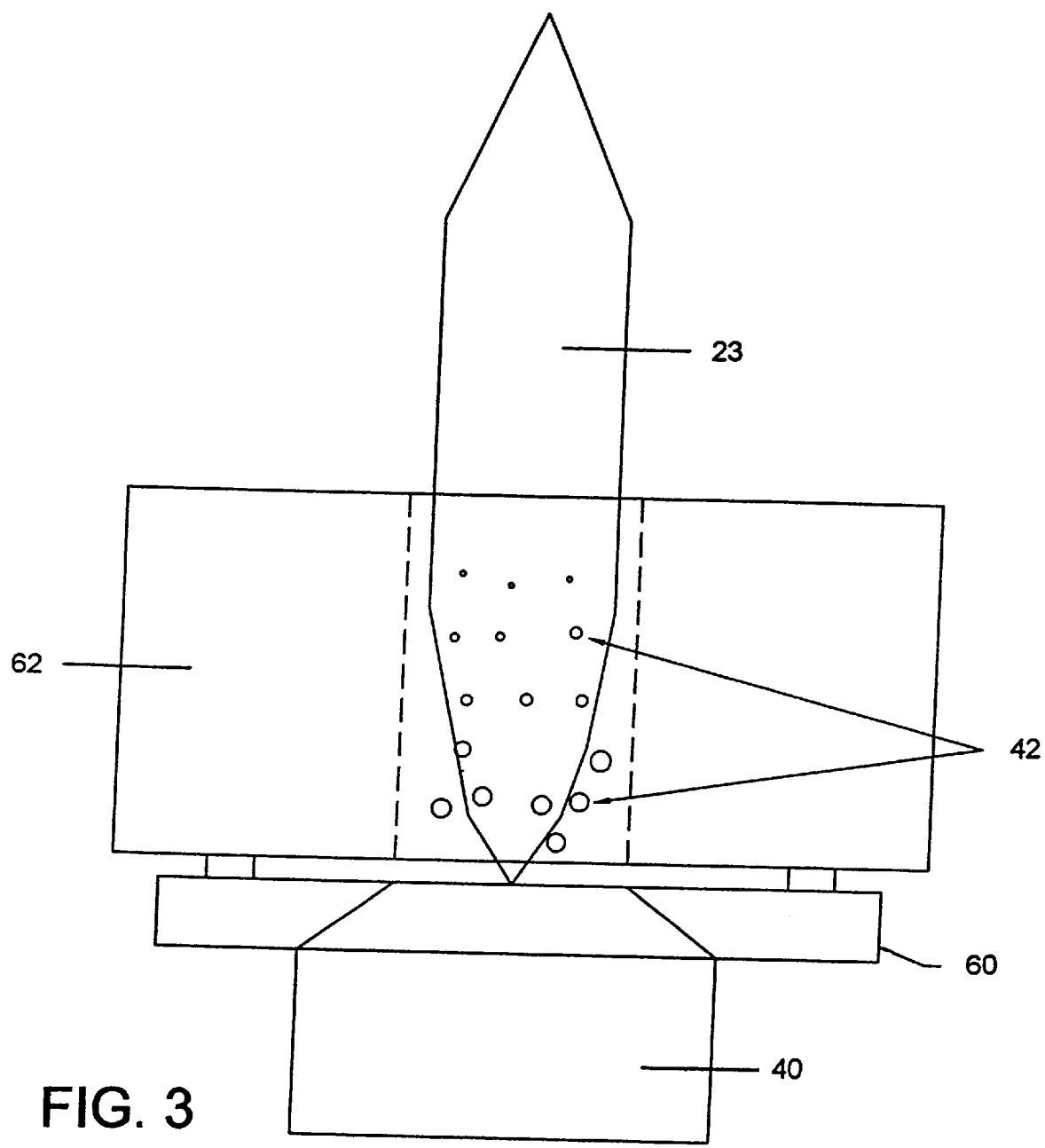
FIG. 3 is a schematic representation of a perspective view of a burner structure having a heater around the burner.

Referring now to FIG. 3, a preferred embodiment of the apparatus of the present invention includes a burner 40, with the details of the burner similar to the burner shown in FIG. 2, which produces a deposition flame 23 to decompose the liquid projections 42 produced by the atomizer (not shown) into soot particles. A heater mount 60 supports a heater 62, which helps vaporize the liquid projections 42, consequently allowing for the velocity of the atomizing gas velocity to be reduced. The additional heat provided by heater 62 will aid in vaporizing the larger liquid projections in the spray size distribution produced by the atomizer.

The heater 62 may be a ceramic ring or tube which surrounds the flame 23, and may further have an auxiliary heating source such as an electrical heater or a gas-fired heater. Tube heater temperatures from about 800° C. to about 1500° C. are preferred, with a more preferred range from about 950° C. to about 1250° C. Using a ceramic ring or tube heater with the heater temperature at about 1000° C. to about 1200° C. allows for the atomizing gas velocity to be reduced by about 50% compared with a burner in which no heater was used.

Figure 4:
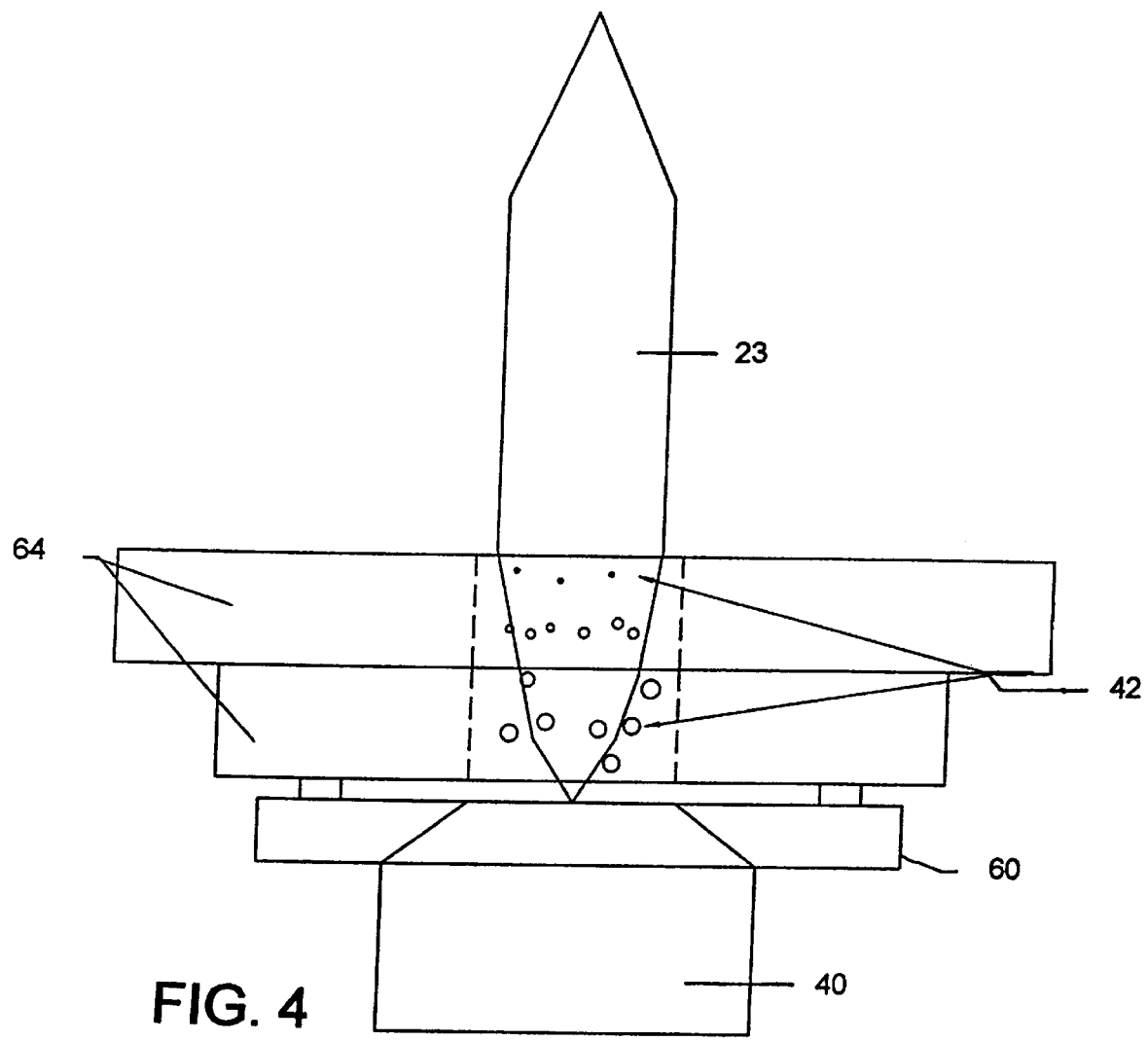
FIG. 4 is a schematic representation of a perspective view of a burner structure surrounded by refractory bricks.

FIG. 4 shows an alternative embodiment of the present invention. A burner 40, produces deposition flame 23, which will decompose the atomized liquid projections 42 exiting from the atomizer (not shown). In this embodiment, heater mount 60 supports an enclosure 64, which retains heat from the burner flame 23, and thus enclosure 64 functions as a heater. Enclosure 64 can be made out of any suitable heat retaining material such as a ceramic material or refractory brick. In still another embodiment (not shown), the burner flame could be surrounded by a ring or tube heater having an additional heater source, and the entire structure could be enclosed by an enclosure made from a heat retaining material.

In addition to effectively reducing liquid projection size in the spray, additional heat provided by the heater 62 can increase soot capture rate by increased thermophoresis. Thermophoresis is the process by which soot is attracted to the preform. In fact, it produces the driving force which moves the particles towards the cooler preform. The hot gases from the burner pass around the preform during laydown; the soot particles do not have sufficient momentum by combustion alone to strike the preform. Thermophoresis moves particles in a temperature gradient from hot regions to cooler regions. The burnt gases from a burner are hotter than the preform. As these gases pass around the preform, a temperature gradient is produced. Hot gas molecules have higher velocity than cold gas molecules. When hot gas molecules strike a particle, they transmit more momentum to the particle than a cold gas molecule does. Thus, particles are driven towards the colder gas molecules and, in turn, toward the preform. It is believed that the soot particles, after being provided with additional heat from the heater, will have a larger driving force to attract them to a relatively cooler target.

The heater also reduces the lizard skin defect on the surface of a soot blank or preform used for optical waveguides. By using a heater with a liquid burner in accordance with the present invention allows for reduced atomizing gas velocity which reduces flame turbulence providing for better quality soot and soot preforms.

The apparatus can also be provided with dopant supply tank 16, shown in FIG. 1, which contains a compound capable of being converted by oxidation or flame hydrolysis to $P_2O_5$ or to a metal oxide whose metallic component is selected from Groups IA, IB, IIA, IIB, IIIA, IIIB, IVA, IVB, VA, and the rare earth series of the Periodic Table. These oxide dopants combine with the silica generated in the burner to provide doped silica glass, which can be subsequently formed into optical waveguide fibers.

The compound that provides the silica glass dopant can be provided to feed tank 11 from dopant supply 16 of FIG. 1. Alternatively, the dopant can be delivered from supply 16 to liquid injector 15 via a separate metering pump and optionally a filter (not shown) analogous to the delivery system used for the silicon-containing compound.

In accordance with the invention, the preferably halide-free, silicon-containing reactant compound preferably comprises a polyalkylsiloxane, for example, hexamethyldisiloxane. More preferably, the polyalkylsiloxane comprises a polymethylcyclosiloxane. Most preferably, the polymethylcyclosiloxane is selected from the group consisting of hexamethylcyclotrisiloxane, octamethylcyclotetrasiloxane, decamethylcyclopentasiloxane, dodecamethylcyclohexasiloxane, and mixtures thereof.

The invention has been described in detail for the purpose of illustration, but it is understood that such detail is solely for that purpose and variations can be made therein by those skilled in the art without departing from the spirit and scope of the invention, which is defined by the following claims.

We claim:

1. A method of manufacturing silica comprising the steps of:
   a) delivering a liquid feedstock in the liquid form to a burner flame, said burner flame forming a conversion site;
   b) atomizing said liquid feedstock proximate the conversion site;
   c) converting said atomized feedstock into silica at the conversion site using a combustion burner; and
   d) providing a heater proximate the conversion site.

2. A method as claimed in claim 1 wherein said liquid feedstock is a liquid siloxane.

3. A method as claimed in claim 2, further comprising the step of depositing the silica to form a waveguide preform.

4. A method as claimed in claim 2, wherein said step of atomizing said liquid siloxane further comprises the step of pneumatically atomizing said liquid siloxane feedstock.

5. A method as claimed in claim 4, wherein said step of pneumatically atomizing said liquid siloxane feedstock further comprises the step of atomizing the liquid siloxane feedstock with the kinetic energy of a flowing gas stream.

6. A method as claimed in claim 5, wherein said step of pneumatically atomizing said liquid siloxane feedstock further comprises the step of pneumatically blasting said liquid siloxane feedstock with a gas selected from the group consisting of a combustible gas, an inert gas, oxygen gas, or a mixture of oxygen and an inert gas.

7. A method as claimed in claim 2, wherein the heater comprises an enclosure around said conversion site for retaining the heat provided by said combustion burner.

8. A method as claimed in claim 7, wherein said enclosure comprises refractory brick.

9. A method as claimed in claim 7, wherein said enclosure comprises a ring heater having an additional heat source.

10. A method as claimed in claim 2, said method further comprising the step of doping said silica preform with at least one member of a group consisting of $P_2O_5$ and a metal oxide having a metallic component selected from Groups IA, IB, IIA, IIB, IIIA, IIIB, IVA, IVB, VA, and the rare earth series of the Periodic Table of Elements.

11. A silica manufacturing apparatus comprising:
a tank containing a liquid feedstock;
a liquid feedstock delivery conduit system having a first terminal end and a second terminal end, said first terminal end of said conduit system connected to said liquid feedstock tank, said second terminal end of said conduit system connected to a combustion burner;
a liquid feedstock atomizer, said atomizer proximate the second terminal end of said liquid feedstock delivery conduit system;
a feedstock to silica conversion site comprising a flame adjacent said atomizer, wherein feedstock projected from said atomizer is converted into silica; and
a heater proximate said conversion site.

12. A silica manufacturing apparatus as claimed in claim 11, wherein said liquid feedstock is liquid siloxane.

13. A silica manufacturing apparatus comprising:
a tank containing liquid siloxane feedstock;
a liquid siloxane feedstock delivery conduit having a first terminal end and a second terminal end, said first terminal end connected to said liquid siloxane feedstock tank;
a liquid siloxane feedstock atomizer proximate the second terminal end of said liquid feedstock delivery conduit;
a liquid siloxane feedstock to silica conversion site comprising a flame proximate said atomizer, wherein liquid siloxane feedstock projected from said atomizer is converted into silica; and
a heater proximate said conversion site comprising an additional heating source disposed around said conversion site.

14. An apparatus as claimed in claim 12, wherein the heater comprises an enclosure around said conversion site for retaining the heat provided by said combustion burner.

15. An apparatus as claimed in claim 14, wherein said enclosure comprises refractory brick.

16. An apparatus as claimed in claim 14, wherein the enclosure further includes an additional heat source.

17. An apparatus as claimed in claim 11, wherein said atomizer comprises a pneumatic atomizer.

18. An apparatus as claimed in claim 17, wherein said pneumatic atomizer is proximate said combustion burner.

19. A method of manufacturing silica comprising the steps of: converting a liquid silicon containing feedstock into silica at a conversion site using a flame from a combustion burner, the burner having a heater proximate said flame and said conversion site.

20. The method of claim 19, wherein said liquid silicon containing feedstock is atomized proximate said conversion site.

21. The method of claim 19, said heater comprising an enclosure around said conversion site proximate said burner for retaining the heat provided by said combustion burner.

22. The method of claim 21, wherein said enclosure comprises a ring heater having an additional heat source.

* * * * *